Feb. 12, 1946.  J. R. JOHNSON  2,394,699
BROACHING MACHINE
Filed Sept. 4, 1942  6 Sheets-Sheet 1

FIG. 1

INVENTOR
J. R. JOHNSON
BY Harry L. Duft
ATTORNEY

Feb. 12, 1946.    J. R. JOHNSON    2,394,699
BROACHING MACHINE
Filed Sept. 4, 1942    6 Sheets-Sheet 6

INVENTOR
J. R. JOHNSON
BY
ATTORNEY

Patented Feb. 12, 1946

2,394,699

UNITED STATES PATENT OFFICE 2,394,699

BROACHING MACHINE

Joel R. Johnson, Chicago, Ill., assignor to Western Electric Company, Incorporated, New York, N. Y., a corporation of New York Application September 4, 1942, Serial No. 457,329

13 Claims. (Cl. 90—33)

This invention relates to an article handling apparatus and more particularly to apparatus for unloading finished articles from a broaching machine.

It is an object of the present invention to provide a simple apparatus for expeditiously unloading a plurality of articles from a processing machine.

In accordance with one embodiment of the invention, apparatus is provided for simultaneously unloading a large number of formed parts or articles from a broaching apparatus wherein, upon the manual actuation of a single handle, a pair of unloading members are oscillated about a common axis into engagement with a row of parts or articles which have been broached in the broaching apparatus to complete the formation of the articles. The unloading members are interconnected by suitable gearing whereby the initial operation of the manually operated handle causes the two unloading members to oscillate toward each other. Further movement of the manually operable handle will cause the two unloading members to rock in the same direction after having gripped the parts between them to carry the parts to a position where they may be assembled on a suitable fixture, for example, a fork-like member which may be manually engaged with the parts. Resilient means are provided for normally urging the unloading members to a position where they are spaced apart preparatory to moving toward each other to hold the articles which have been completed in the broaching apparatus, and, upon release of the manually actuatable handle, the unloading members will be returned to their normal position.

In accordance with another embodiment of the invention, the unloading members are actuated by a single manually operable handle, but instead of oscillating about a common axis, the unloading members are reciprocable and upon the operation of the handle, the unloading members will first move toward each other and thereafter, upon continued movement of the handle, both of the unloading members will move in the same direction to carry the finished articles out of the position in which they were formed to an unloading position where a suitable fixture may be utilized to strip them from the unloading members.

A better understanding of the invention may be had by reference to the accompanying drawings, wherein.

Figure 1:
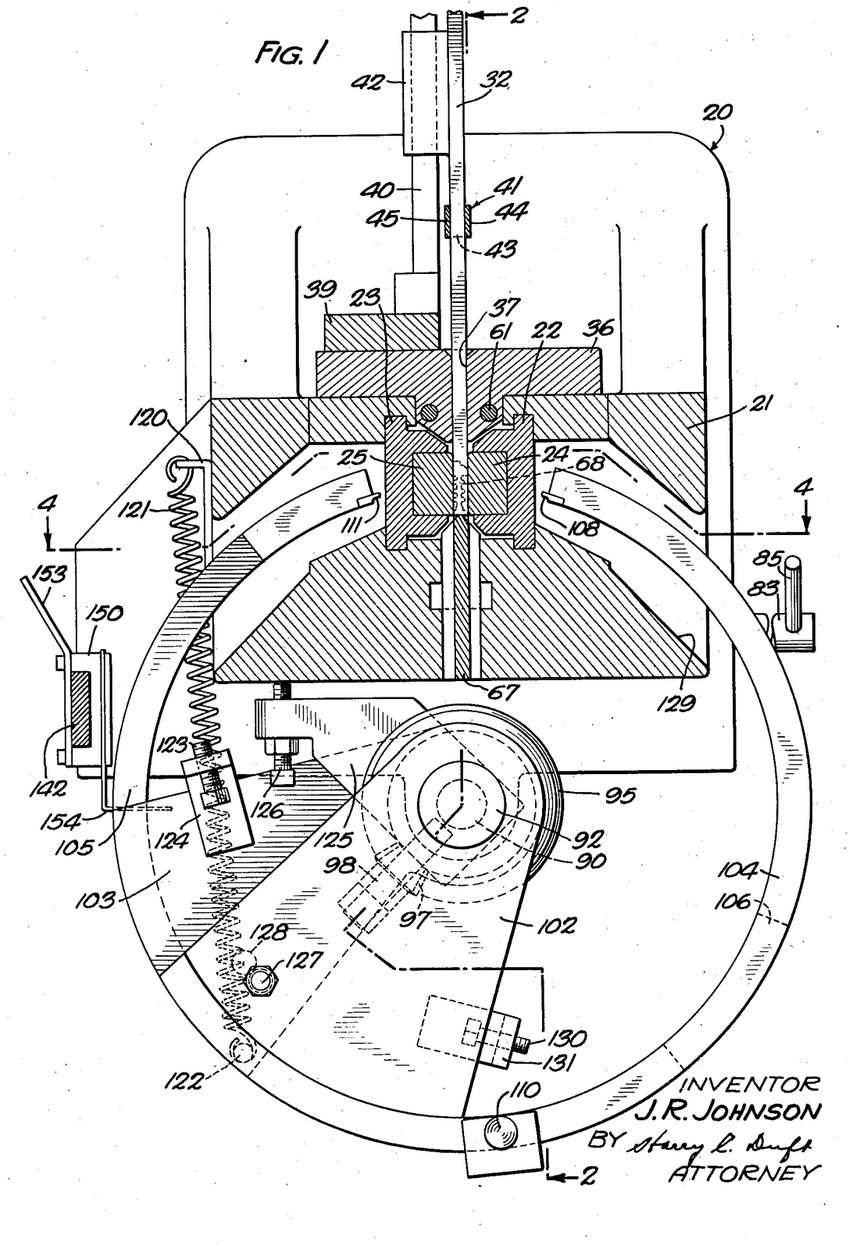
Fig. 1 is a sectional view taken through a broaching apparatus and showing an unloading fixture made in accordance with the preferred embodiment of the present invention in front elevation.
Figures 2, 3:
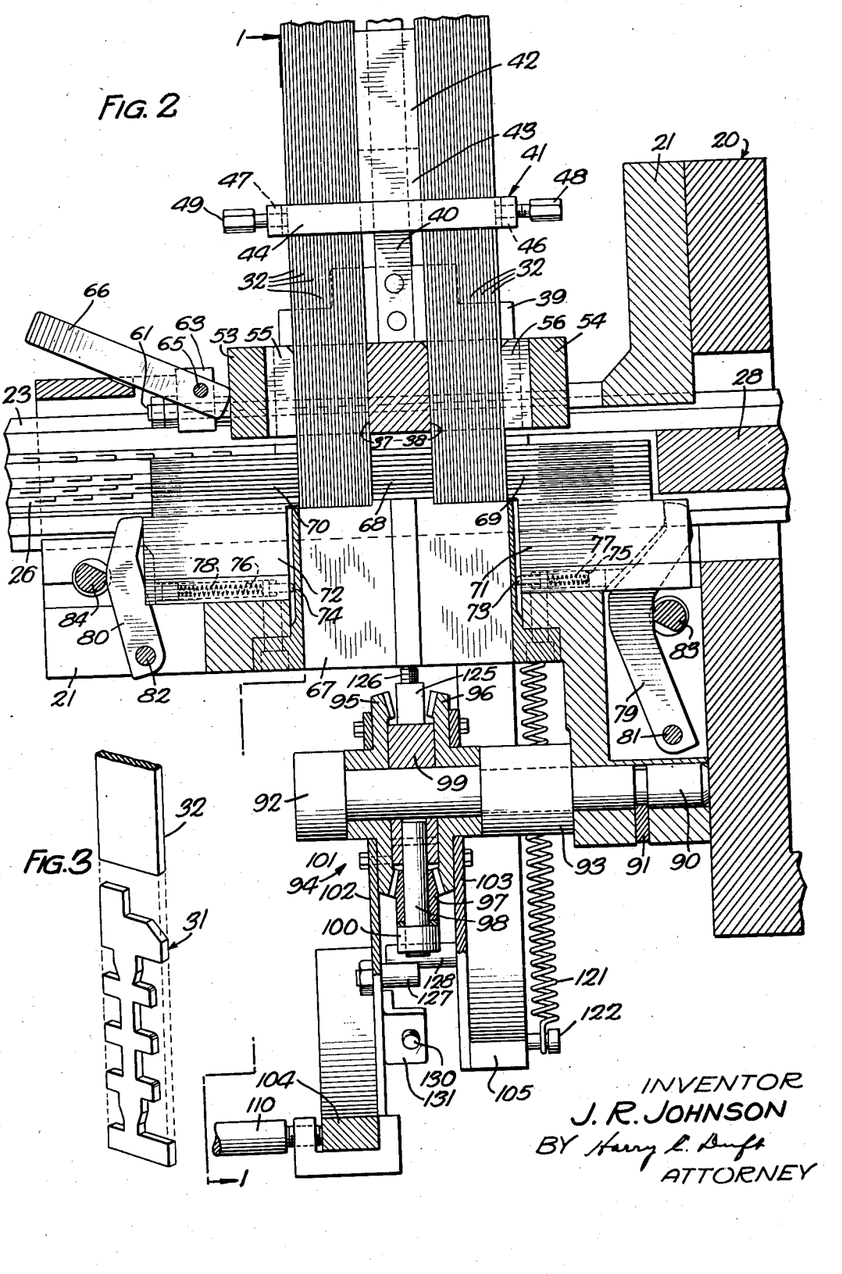
Fig. 2 is an irregular vertical sectional view taken substantially along the line 2—2 of Fig. 1 in the direction of the arrows.
Fig. 3 is a view in perspective of the article formed by the broaching tool and showing the strip from which the article has been cut in the broaching operation.
Figure 4:
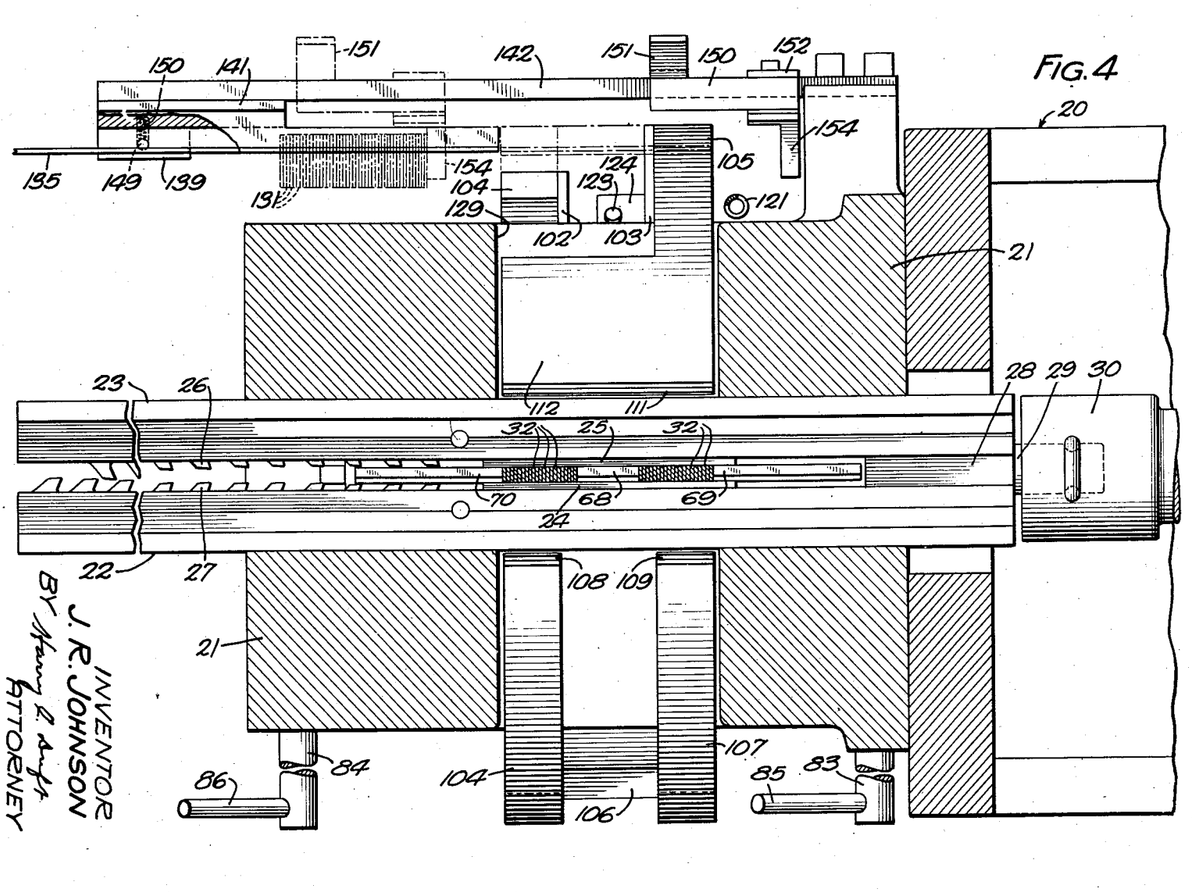
Fig. 4 is a plan sectional view taken substantially along the line 4—4 of Fig. 1 in the direction of the arrows.
Figure 5:
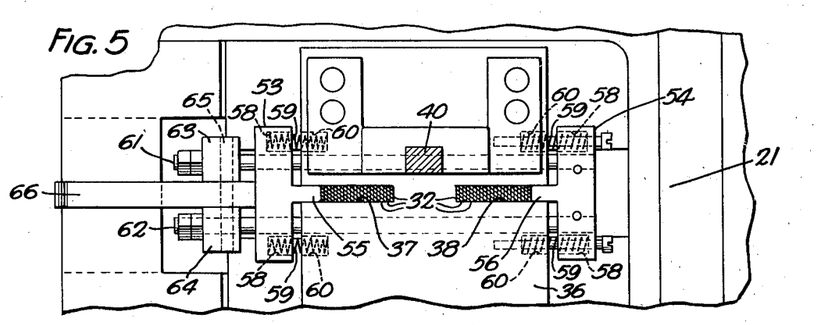
Fig. 5 is a fragmentary detail plan view of a portion of the broaching mechanism which cooperates with the unloading mechanism and serves to hold a plurality of blanks in position to be broached by the broaching tool prior to being unloaded by the apparatus constituting the preferred embodiment of the present invention.

Referring to the drawings, wherein like reference characters designate the same parts throughout the several views, particular reference being had to Figs. 1, 2 and 4, a broaching apparatus 20 has projecting from its face a guide block 21, which slidably supports a pair of broach holders 22 and 23 carrying guide blocks 24 and 25, respectively. The broach holders 22 and 23 are provided with broaching tools 26 and 27, respectively, which the broaching apparatus 20 actuates in the usual manner, the broach holders 22 and 23 being interconnected at their end adjacent the broaching apparatus by a plug 28 from which there extends a projection 29 adapted to be gripped by a chuck 30. The broaching apparatus 20 is designed to impart reciprocation to the broach holders 22 and 23 to move them to the right and left (Fig. 4) in the guide block 21 for the purpose of, in a single stroke of the broaching tool, forming an article 31 as illustrated in Fig. 3. The article 31 comprises a contact spring actuator for telephone switching units, known as a crossbar switch operating card. The tools 26 and 27 are so formed that they will cut the various notches as shown in the article 31 and also sever the article from a piece of stock 32. In the operation of the apparatus, fifty of these cards are formed in a single stroke of the broach, fifty pieces of stock 32 being provided and being held in the path of the broaching tool by clamping mechanism to be described. Fixed on the upper surface of the guide block 21 is a stock guiding member 36, as best seen in Figs. 1, 2 and 5. The stock guiding member 36 is provided with a pair of slots 37 and 38, as best seen in Fig. 5, into each of each twenty-five pieces of stock 32 may be set preparatory to the broaching tools 26 and 27 forming the article 31. Extending upwardly from the stock guiding member 36 is a support block 39, to which there is secured a post 40. The post 40 extends upwardly an appreciable distance above the support block 39 and serves as a guide for a stock clamp, designated generally by the numeral 41. The stock clamp 41 comprises a slide portion 42 (Figs. 1 and 2) which surrounds the post 40 and extends outwardly between two groups of pieces of stock 32. The slide 42 has a portion 43 thereof extending downwardly between the two groups of pieces of stock and, at the lower end of the portion 43, there are secured to it two plates 44 and 45. These plates 44 and 45 are joined at their outer ends by threaded plugs 46 and 47 (Fig. 2) into which thumb screws 48 and 49 may be threaded. Thus, the groups of pieces of stock 32 may be held between the portion 43 of the stock clamp 41 and the thumb nuts 48 and 49, but may be freely slid up and down with respect to the rod 40. In this manner, the upper ends of the pieces of stock 32 are held relatively secure in alignment with the slots 37 and 38 in the stock guiding member 36.

Mounted on opposite sides of the stock guiding member 36 are a pair of T-shaped members 53 and 54, which have clamping portions 55 and 56 extending into the slots 37 and 38, respectively. The larger portion of the T-shaped members 53 and 54 are provided with pockets 58—58, in which there are seated springs 59—59, the inner ends of which extend into pockets 60 formed in the stock guiding member 36 so that the T-shaped members 53 and 54 are urged away from the stock guiding members 36 by the spring 59. A pair of rods 61 and 62 extend through and are relatively slidable with respect to the T-shaped member 53 and are fixed to the T-shaped member 54. Fixed to the rods 61 and 62, adjacent their left ends (Fig. 5) are a pair of blocks 63 and 64 in which there is fixed a pivot pin 65. The pivot pin 65 extends between the two blocks 63 and 64 and supports a clamp actuating lever 66, which may be rocked to the position shown in Fig. 2 to force the clamping portions 55 and 56 of the T-shaped members 53 and 54 into engagement with the pieces of stock 32, which are nested in the slots 37 and 38 of the stock guiding member 36, thereby to clamp the pieces of stock against the central portion of the stock guiding member 36 and hold the stock, as shown most clearly in Fig. 2, in position to be engaged by the broaching tools 26 and 27, which have been moved to the left (Fig. 4) preparatory to forming a group of articles 31.

The bottom end of the pieces of stock 32 clamped in the stock guiding member 36 rests upon a stock rest 67, which is provided with a central clamping element 68, against which the lower ends of the pieces of stock 32 may be clamped during the broaching of the stock to form the article 31. Cooperating with the central clamping element 68 are a pair of clamping members 69 and 70, which, together with the central clamping member 68, are cut to have the same configuration as the finished article 31 except that their lower end is not cut away. These clamping elements 68, 69 and 70 are formed approximately to the shape of the article 31 and then before any parts are placed in the apparatus to be broached, the broaching tools 26 and 27 are drawn past the clamping elements to form them to the desired contour which will conform exactly with the contour of the finished article 31. The clamping members 69 and 70 are mounted upon the upper ends of clamp blocks 71 and 72, respectively, as shown most clearly in Fig. 2, and are normally urged away from the stock rest 67 by spring pressed pins 73 and 74, respectively. The pins 73 and 74 are seated in apertures 75 and 76, respectively, formed in the clamp blocks 71 and 72 and are urged toward the stock rest 67 by coil springs 77 and 78, respectively, held in the apertures 75 and 76, respectively. The blocks 71 and 72 are adapted for actuation individually by levers 79 and 80 pivoted on pins 81 and 82, respectively. The pins 81 and 82 are set into the guide block 21 and the levers 79 and 80 engage the clamp blocks 71 and 72 to move them to clamping position when camming shafts 83 and 84 are rocked to the position shown in Fig. 2 by means of handles 85 and 86 (Fig. 4). With the apparatus described hereinbefore, a plurality of pieces of stock 32 may be fixed in position to be broached by the broaching tools 26 and 27 during the operative stroke of the broach carriers 24 and 25, that is, the movement or stroke of the carriers to the right (Figs. 2 and 4) and after the articles have been formed by the broaching tool, they may be removed from the various clamping mechanisms by means of the apparatus illustrated herein. The structural features of the means for holding the pieces of stock 32 during the broaching thereof and the broaching tools used are substantially the same as the two embodiments of the invention covered hereby and it is not believed that it will be necessary to describe the clamping mechanisms for holding the parts in conjunction with the second described embodiment of the apparatus constituting the present invention.

Figures 6, 7:
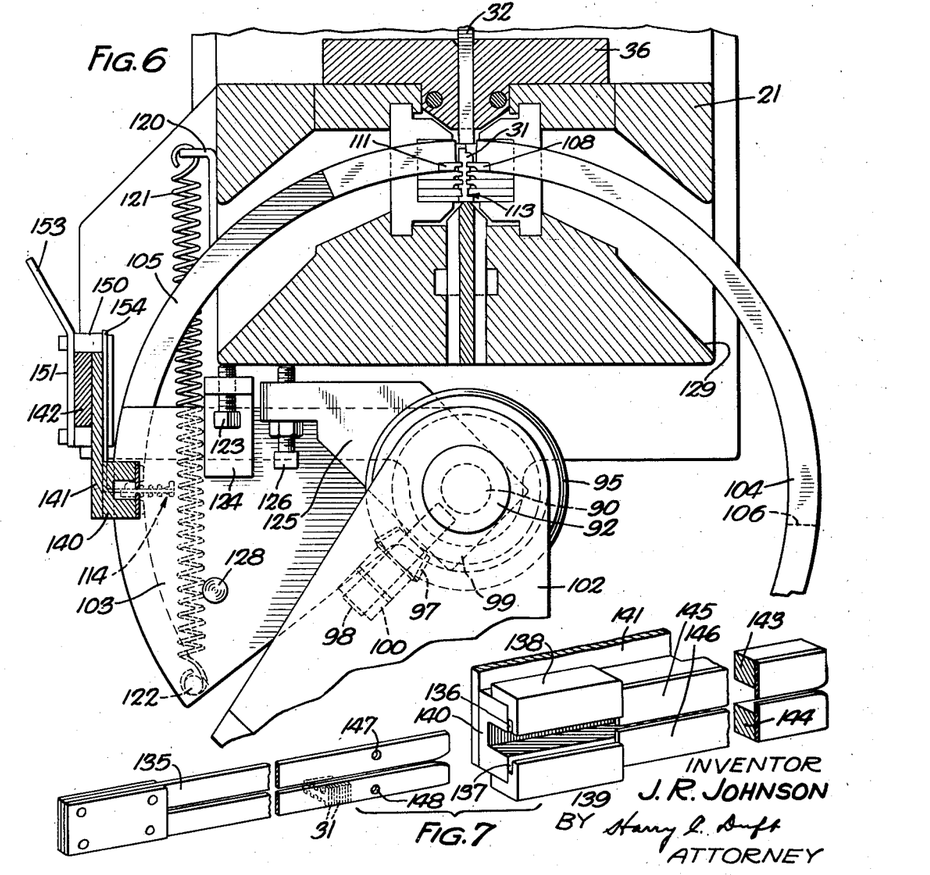
Fig. 6 is a fragmentary view similar to Fig. 1, but showing the unloading members in another position than that shown in Fig. 1, wherein the unloading members have been moved into engagement with the articles to be removed from the broaching tool.
Fig. 7 is a fragmentary detail perspective view of a fixture used in cooperation with the apparatus constituting the invention and which is to receive the articles which have been carried from the position in which they have been broached to the unloading position.

In the preferred embodiment of the invention, the guide block 21, as shown most clearly in Figs. 1, 2 and 6, has a stud shaft 90 fixed in it by means of a locking member 91 (Fig. 2). The stud shaft is provided with a head 92 and a shoulder portion 93 (Fig. 2) between which there is positioned a differential mechanism 94 comprised of ring gears 95 and 96, an intermediate gear 97, an intermediate gear shaft 98 and a shaft supporting ring 99, in which the shaft 98 is fixed. The intermediate gear 97 is freely rotatable on the shaft 98 and held in place thereon by a retainer member 100 and the shaft is fixed in the ring 99 by means of the pin 101. Surrounding hubs of the ring gears 95 and 96 are a pair of segmental plates 102 and 103, which are secured to the ring gears whose hubs they encircle. The plate 102 has fixed to it an arcuately shaped member 104, and, similarly, the plate 103 has fixed to it an arcuately shaped member 105. The arcuately shaped member 104 has fixed to it a spacer 106 of arcuate configuration, which carries an arcuately shaped member 107 formed on the same diameter as the arcuately shaped member 104 and in direct alignment therewith so that when the plate 102 is moved about the shaft 90, the members 104 and 107 will move with it about the axis of the shaft. Each of the arcuately shaped members 104 and 107 is provided with article gripping elements 108 and 109, respectively (Fig. 4), which are designed to be carried by the members 104 and 107 into engagement with the articles 31 that have been formed by the broaching tools 26 and 27. The arcuately shaped member 104 is provided with a handle 110 clamped onto it so that member 104 may be rocked about the axis of the shaft 90 from the position shown in Fig. 1 to and through the position shown in Fig. 6. Upon being moved from the position shown in Fig. 1 to the position shown in Fig. 6, the arcuately shaped members 104 and 107 will engage articles 31 that have been formed by the broaching tools and will, in cooperation with an article gripping member 111 fixed on the end of an enlarged portion 112 of the arcuately shaped member 105, will carry the articles from the position as indicated at 113 to the position as indicated by the dot and dash lines at 114. Fixed to the guide block 21, at its left side (Figs. 1 to 6) is a bracket 120 for holding the end of a coil spring 121, the other end of which is connected to the arcuately shaped member 105 by means of a pin 122 so that the arcuately shaped member 105 is normally urged to the position shown in Fig. 6. A set screw 123 is threaded into a bracket 124 mounted on the plate 103 so that it will engage with the underside of the guide block 21 and limit the movement of the member 105. In this position, the gripping element 111 will be in engagement with the articles 31 in position 113. However, the differential mechanism 94 will normally not permit the spring 121 to move the arcuately shaped member 103 to the position shown in Fig. 6 due to the weight of the arcuately shaped members 104 and 105 and the plates 102 and 103 which support them on the shaft 90, but the arcuately shaped members 104 and 105 will remain in the position shown in Fig. 1 until the handle 110 is moved.

Fixed to the shaft supporting ring 99 is a lever 125, which prevents the ring 99 from moving beyond the position shown in Fig. 1 in a clockwise direction due to the engagement of a set screw 126 threaded in the lever 125 with the underside of the guide block 21. The movement of the arcuately shaped member 105 and arcuately shaped member 104 in a counter-clockwise and clockwise direction, respectively, beyond the position shown in Fig. 1, is prevented by a pair of pins 127 and 128 mounted in the plates 102 and 103 engaging with each other. Thus, the arcuately shaped members 104 and 105 will normally remain in the position shown in Fig. 1 with their upper ends extending partway through an irregularly shaped slot 129 in the guide block 21. When the handle 110 is moved counter-clockwise, the arcuately shaped member 104 will move with it and through the differential mechanism 94, the arcuately shaped member 105 will be permitted to be rocked clockwise by its spring until the article gripping members 108, 109 and 111 grip the articles that have been broached and thereupon the arcuately shaped members 104 and 105 can no longer move relative one to another and the continued movement of the handle 110 will cause the two arcuately shaped members to rock in a counter-clockwise direction until a set screw 130 threaded into a bracket 131 on the plate 102 engages the underside of the guide block 21.

When the arcuately shaped members 104 and 105 have been rocked clockwise to the position where the set screw 130 engages the underside of the guide block 21, they will have carried the articles 31 to the position designated 114. At this position, the articles may be stripped from the article gripping members 108, 109 and 111 and slid onto a fork 135 (Figs. 4 and 7) which may be held in position to receive the articles by inserting it into slots 136 and 137 formed by cooperating surfaces of L-shaped members 138 and 139 and a U-shaped member 140. The U-shaped member 140 is mounted on the lower end of a plate 141, which extends down from a guide bar 142 and the U-shaped member has formed at its right end (Figs. 4 and 7) a pair of rods 143 and 144, to which guide plates 145 and 146 are attached, the guide plates 145 and 146 being spaced apart a distance sufficient to permit articles 31 to be slid through the open portion of the U-shaped member, and between the rods 143 and 144. The rods 143 and 144 and guide plates 145 and 146 extend over to the right (Fig. 4) to a position where they will be in close proximity to the article gripping members 108, 109 and 111, when the article gripping members are rocked around to the position indicated at 114 so that parts may be stripped from the article gripping members and slid between the adjacent edges of the plates 145 and 146 preparatory to feeding them onto the fork 135. The fork 135 is provided with a pair of indentations or apertures 147 and 148 (Fig. 7), into which locking pawls 149 may be urged by springs 150, there being one of the locking pawls 149 and a spring 150 set into each leg of the U-shaped member 140 to hold the fork 135 in place in the slots 136 and 137 while articles 31 are slipped between the tines or prongs of the fork. This retaining arrangement will hold the fork 135 with its right end (Fig. 7) abutting the left ends of the plates 145 and 146 so that articles which are slid along between the plates 145 and 146 will enter between the tines of the fork 135.

The mechanism for sliding the articles out of the article gripping members 108, 109 and 111 and into position between the plates 145 and 146 comprises a U-shaped framework 150, which extends around the guide rod 142 and has attached to it a pair of plates 151 and 152, which serve to retain the U-shaped member 150 on the guide rod 142. The plate 151 is bent over, as shown at 153, to provide a handle for sliding the U-shaped member 150 back and forth on the rod 142. The right side (Fig. 6) of the member 150 has mounted on it an L-shaped member 154, which is normally in the position shown in Fig. 4, but which may be slid with the U-shaped member 150 from the position shown in full lines in Fig. 4 to the position shown in dot and dash lines to transfer articles 31 from the article gripping members 108, 109 and 111 over to the position between the plates 145 and 146. As the number of articles 31 accumulates between the plates 145 and 146 and more articles are pushed out of the article gripping members 108, 109 and 111, the articles will ultimately be pushed onto the fork 135.

In the operation of the apparatus, a number of pieces of stock, usually approximately 50 pieces in two groups of 25 pieces each, are placed between the broach holders 24 and 25, as shown in Fig. 4 while the chuck 30 and the broaching tools 26 and 27 are in their extreme forward position, that is, to the left (Fig. 4). After a number of strips of stock have been inserted in position in this manner, the strip of stock being held together by means of the stock clamp 41, the clamp actuating lever 66 may be moved to the position shown in Fig. 2, where it will clamp the pieces of stock 32 just above the portion thereof which is to be broached. After the clamp 66 has been thus set in position, the handles 85 and 86 may be moved to rock the camming shafts 83 and 84 to the position shown in Fig. 2, where the clamping members 69 and 70 are pressing the pieces of stock in the area thereof to be broached against the central clamping element 68. After the stock has thus been placed in position to be broached, the broaching apparatus 20 may be operated to draw the broach tools 26 and 27 to the right (Figs. 2 and 4). In moving to the right (Figs. 2 and 4), the broaching tools 26 and 27 will form the article 31 to the configuration shown in Fig. 3, completely severing the articles 31 from the strips of stock 32 in a single stroke of the broaching tool. While leaving the clamp actuating lever 66 in the position shown, the handles 85 and 86 may be rocked to the position where the camming shafts 83 and 84 will permit their associated levers 79 and 80 to rock away from the central clamping element 68. This will permit the springs 77 and 78 to push the clamping members 69 and 70 out of engagement with the articles 31 that have been formed by the broach stroke. However, if the clamping members 69 and 70 are released at this time, the parts might become mixed or fall out of their proper position and, accordingly, just before the clamping members 69 and 70 are released, the handle 110 (Fig. 1) should be rocked in a counter-clockwise direction to carry the article gripping members 108, 109 and 111 to the position shown in Fig. 6 and then the clamping members 69 and 70 may be released without releasing the handle 110. As soon as the articles 31 are released by the clamping members 69 and 70, the article gripping members 108, 109 and 111 may be rocked in a counter-clockwise direction to carry the articles to the position shown at 114, at which time the set screw 130 will engage the underside of the guide block 21 and prevent further movement of the arcuately shaped members 104 and 105 and the parts will thus be carried to the position to be stripped from the article gripping members 108 and 109 by the L-shaped member 154. The L-shaped member 154 may be moved to the left (Fig. 7) to strip the parts from the article gripping members 108, 109 and 111 and into position between the plates 145 and 146. After the articles 31 have thus been loaded onto the plates 145 and 146, they may be pushed onto the fork 135 either directly by hand or by other articles formed in later operations and pushed through the slot formed by the plates 145 and 146.

It will be understood that the arcuately shaped members 104 and 105 will, on the initial movement of the handle 110, be rocked in opposite directions to engage the articles 31 and that continued movement of the handle 110 in a counterclockwise direction will result in the transfer of the formed articles from the position in which they are broached, as indicated at 113, to the position where they may be unloaded from the article gripping members 108, 109 and 111. After articles have been stripped from the gripping members 108, 109 and 111, the U-shaped member 150 may be pushed back to the position shown in full lines in Fig. 4 and then when the handle 110 is released, the spring 121 will return the arcuately shaped members 104 and 105 to the position shown in Fig. 1 due to the connection between the parts through the differential mechanism 94 and when the parts return to this position, the ring 99 will have carried the lever 125 to position where the set screw 126 will engage the underside of the guide block 21.

As pointed out hereinbefore, the clamping mechanisms for holding the pieces of stock 32 in position in the broaching apparatus during the broaching thereof are substantially the same as in the second embodiment of the invention as in the first embodiment and, therefore, it will suffice to say that the pieces of stock are suitably gripped in position to be broached and after the articles 31 are formed by the stroke of the broaching tool, the articles may be unloaded from between the clamps which held them by the apparatus now to be described.

Figures 11, 12:
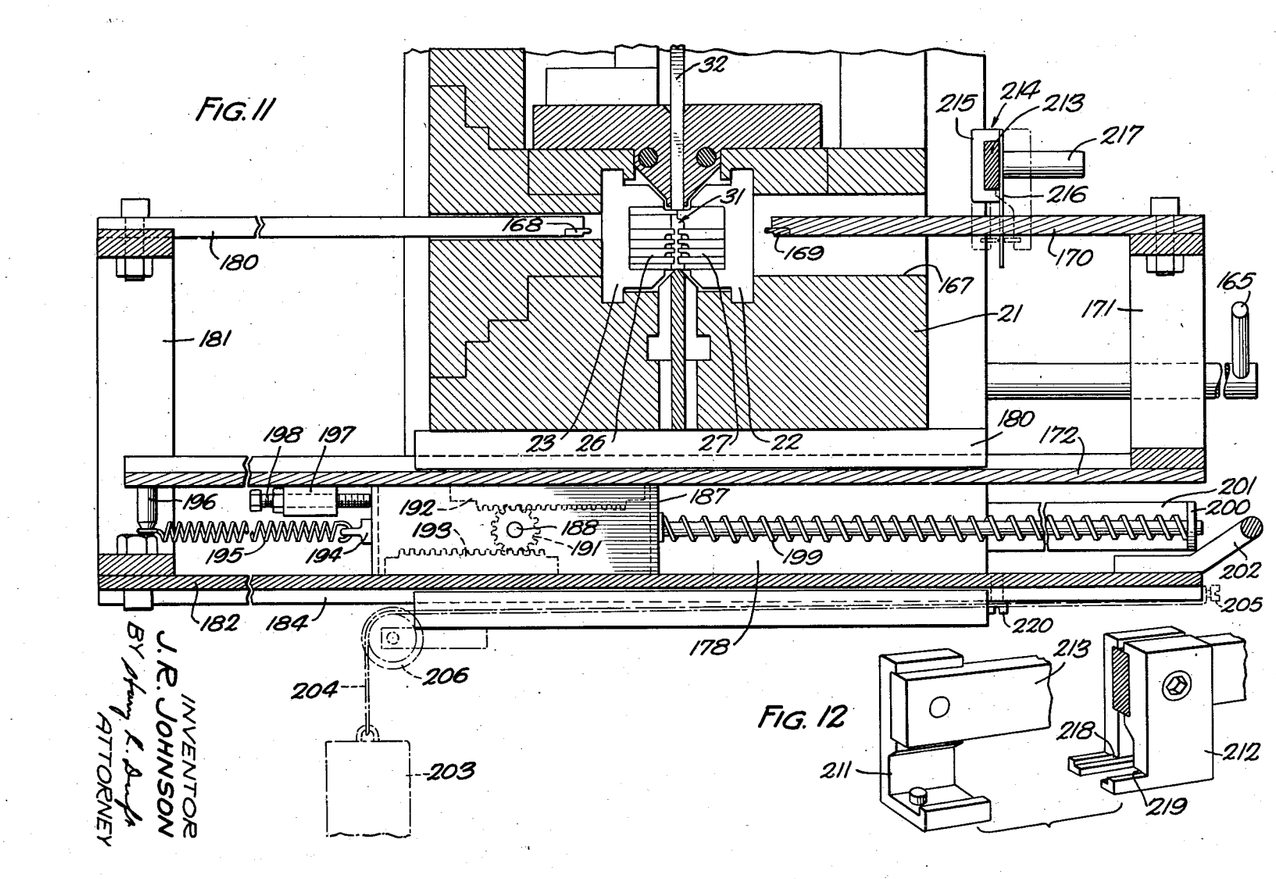
Fig. 11 is a vertical sectional view taken substantially along the line 11—11 of Fig. 8 in the direction of the arrows.
Fig. 12 is a view in perspective of a support for holding the fork-like member onto which the parts are to be pushed.

In this embodiment of the invention, clamping members 160 and 161, similar to the clamping members 69 and 70, are provided and are moved toward a central clamping element 162 by levers 163 and 164 operated by handles 165 and 166, respectively. The irregularly shaped slot 167 in the guide block 21, as seen most clearly in Fig. 11, extends across the guide block 21 instead of in a substantially arcuate path, as did the slot 129. There are movable in the irregularly shaped slot 167 two article gripping members 168, similar to the article gripping members 108 and 109 and an article gripping member 169 similar to the article gripping member 111. The article gripping member 169 is mounted upon the end of a plate 170 fixed to the top surface of a rectangular frame 171. The rectangular frame 171 is mounted on the upper surface of a slidable plate 172, which may be reciprocated across the guide block 21. The plate 172 has a pair of guide members 173 and 174 (Fig. 8) fixed to it, which are slidable in slots 175 and 176 formed in brackets 177 and 178 that extend downwardly from the guide block 21. A pair of retaining members 179 and 180 are provided for holding the guide members 173 and 174, respectively, in the slots 175 and 176.

Figures 8, 9:
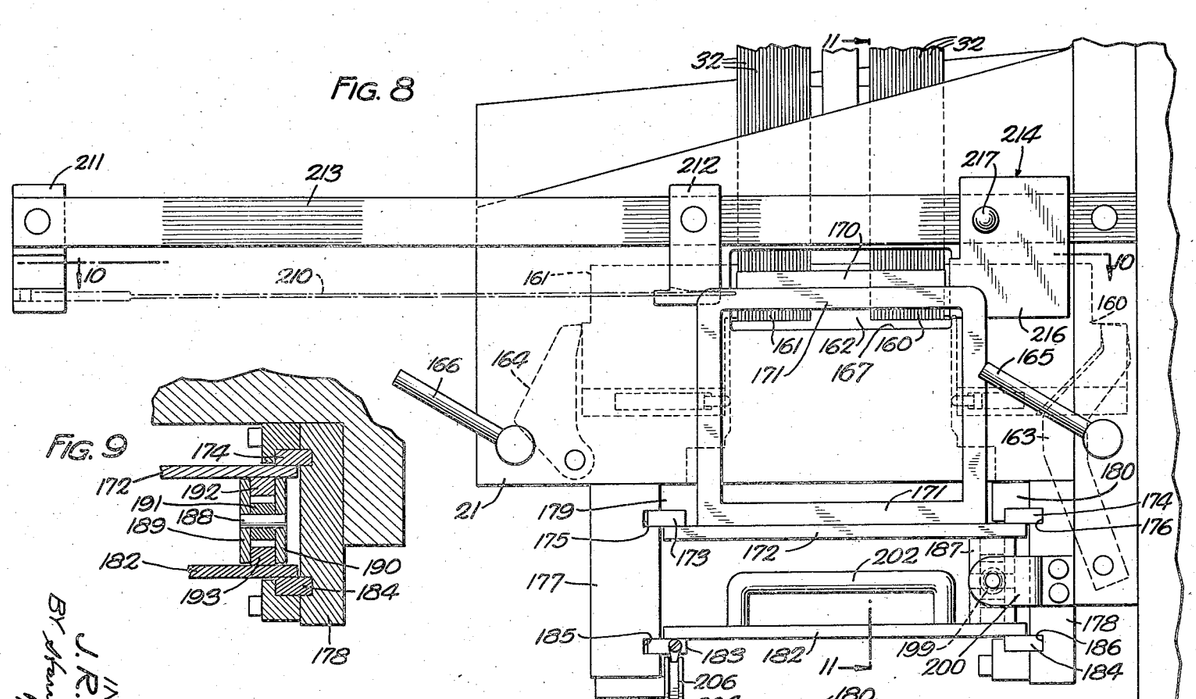
Fig. 8 is a side elevational view of the second mentioned embodiment of the invention.
Fig. 9 is a fragmentary sectional view through the gearing for causing the unloading members to move toward each other.

The article gripping members 168 are mounted on the right ends of a pair of narrow plates 180, which are, in turn, fixed to the upper surface of a rectangular framework 181, similar to the framework 171, but higher than the framework 171. The framework 181 is fixed to the upper surface of a slidable plate 182. The plate 182 is, in turn, mounted upon the upper surfaces of a pair of guide members 183 and 184, which are slidable in ways 185 and 186 formed in the brackets 177 and 178, respectively. Positioned between the plates 172 and 182 is a box-like structure 187 having a stud shaft 188 fixed in its side plates 189 and 190 (Fig. 9). The stud shaft 188 has freely rotatable on it a gear 191, which meshes with a pair of racks 192 and 193 mounted on the lower and upper surfaces of the plates 172 and 182, respectively. The structure 187 has a screw eye 194 attached to its left end (Fig. 11) to which one end of a contractile spring 195 is attached. The other end of the spring 195 is hooked on a pin 196 extending downwardly from the undersurface of the plate 172. Also mounted on the undersurface of the plate 172 is a bracket 197, in which there is threaded an adjustable stop member 198. Thus, the spring 195 tends to pull the structure 187 over against the stop member 198, thereby to hold the plates 182 and 172 in the position shown in Fig. 11.

Figure 10:
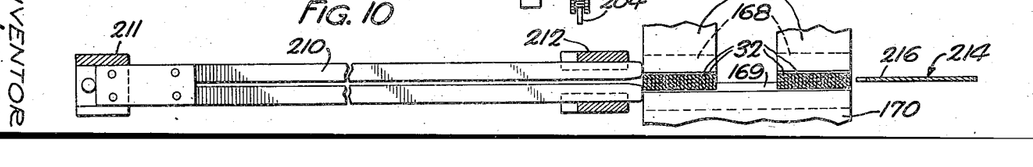
Fig. 10 is a fragmentary plan section taken substantially along the line 10—10 of Fig. 8 in the direction of the arrows showing the fork-like member or fixture on which the parts are ultimately positioned.

In addition to the spring 195, which tends to draw the structure 187 to the left with respect to the plate 172, a compressing spring 199, which is interposed between the right end of the structure 187 and a bent-over portion 200 of a bracket 201, tends to push the structure 187 to the left (Fig. 11) with respect to the bracket 178. The plate 182 is provided with a handle 202, whereby the plate 182 may be moved to the right against the action of a weight 203 suspended at the end of a strand 204, which has its opposite end fixed to the plate 182 at 205 and which passes over a freely rotatable roller 206 mounted for rotation on the underside of the bracket 178. When the handle 202 is moved to the right to pull the weight 203 upwardly, the spring 199 will resist movement of the structure 187 to the right and, thereafter, the rack 193 will move to the right with respect to the gear 191 and the gear 191 will be rotated. When the gear 191 rotates, rack 192 will be moved to the left to carry the plate 172 to the left against the action of spring 195. As the plate 182 moves to the right (Fig. 11) and the plate 172 moves to the left, the article gripping members 168 and 169 will be moved into engagement with the articles 31, held between the clamps 160 and 161. When the article gripping members 168 and 169 engage the articles, no further movement of the structure 187 with respect to the plates 182 and 172 will be possible, and therefore, the structure 187 will then move with the plate 182 against the action of the spring 199 to transfer the articles 31 to a position in alignment with a fork 210 (Figs. 8 and 10), which is supported on a pair of brackets 211 and 212 fixed to a support bar 213, which is, in turn, mounted upon the guide block 21. Slidable upon the support bar 213 is a stripper 214 comprised of a U-shaped member 215 surrounding the support bar 213, a stripper plate 216 and a handle 217. While the handle 202 is held in its left-hand position (Fig. 11), the fork 210 may be slid into aligned notches in the article 31 below the position where they are gripped by the article gripping members 168 and 169, the fork being guided in slots 218 and 219 formed in the bracket 212 and then the stripper 214 may be moved to the left to carry the plate 216 from the position shown in Fig. 10 across the gap between the gripping members 168 and 169, whereby the articles 31 will be slipped onto fork 210 and then upon further movement of the stripper 214, to the left with the fork 210, the fork 210 may be returned to the position shown in Fig. 10, where it will be out of the path of the plate 170. After the articles 31 have thus been loaded on the fork 210, the handle 202 may be released, whereupon the weight 203 will carry the plate 182 back to the position shown in Fig. 11, where the stop screw 220 will engage with the side of the bracket 178 and permit further movement of the plate 182 to the left. At this time, the spring 199 will urge the structure 187 to the left, whereas the spring 195 will urge the plate 172 to the right with respect to the structure 187, thus to return the apparatus to the position shown in Fig. 11. It will be understood that the mode of operation of the last described embodiment of the invention is substantially the same as the mode of operation of the first described embodiment except that instead of the article gripping members travelling on the arc of a circle, they move in a straight line to the unloading position and that with the unloading fixture structure in accordance with the second embodiment of the invention, the fork 210 must be moved to the right (Fig. 10) to engage the articles before they are released by the article gripping members 168 and 169 and the fork must then be retracted after the stripper 214 has pushed the articles nested in the fork past the gap in the gripping members 168. Thereupon, continued movement (Fig. 10) of the stripper 214 to the left will cause the parts to be pushed with the fork 210 to the left and the parts will thus be supported on the fork 210.

What is claimed is:

1. An article handling apparatus comprising means for holding a plurality of articles in a predetermined position, unloading members engageable with the articles in said position, a resilient means for urging the unloading members to move with respect to articles in said position, counterbalance means normally holding said unloading members from moving under the influence of the resilient means, and means interconnecting the unloading members for causing one of the unloading members to move toward the other unloading member and then to move with said other unloading member.

2. An article handling apparatus comprising means for holding a plurality of articles in a predetermined position, unloading members engageable with the articles in said position, actuating means for the unloading members, means including a plurality of gears interconnecting said unloading members, resilient means normally biasing the unloading members to move with respect to the articles in said position, and counterbalance means for said resilient means normally holding said unloading members from moving under the influence of the resilient means and operable under control of the actuating means to cause one of said unloading members to engage the articles and then to move with said other unloading member to cooperate with it in carrying articles out of said predetermined position.

3. An article handling apparatus comprising unloading members, a handle attached to one of said unloading members, gear means interconnecting said unloading members, resilient means normally tending to cause one of the unloading members to move toward the unloading member having the handle on it when the unloading member having the handle attached to it is moved toward the articles, said means interconnecting the unloading members also being effective to move the second unloading member with the first mentioned unloading member after the unloading members have engaged the article, and counterbalance means normally holding said unloading members against movement by said resilient means.

4. An article handling apparatus comprising means for holding a plurality of articles in a predetermined position, a pair of unloading members engageable with the articles in said predetermined position, an actuating means for said unloading members, and means interconnecting the unloading members and operable under the influence of said actuating means for first causing one unloading member to move toward the other unloading member and to later move in the same direction as said other unloading member, said interconnecting means including a resiliently actuated gear mechanism normally tending to move said unloading members toward each other.

5. An article handling apparatus comprising means for holding a plurality of articles in a predetermined position, article gripping members engageable with the articles in said position, arcuately shaped members for carrying said article gripping members, means for supporting said arcuately shaped members for movement about a common axis, and means interconnecting said last mentioned means for causing one of said arcuately shaped members to rotate first in one direction to grip the articles and then in the other direction to cooperate with the other arcuately shaped member in carrying the article out of said predetermined position.

6. An article handling apparatus, an article engaging means movable into engagement with one side of a plurality of articles, another article engaging means cooperating with said first mentioned means for moving into engagement with the opposite side of said plurality of articles, arcuately shaped members for supporting said article engaging means, a shaft for rotatably supporting both of said members, a handle on one of said members for rocking it in one direction, and means interconnecting said members for transmitting motion from the member having the handle thereon to cause the other member to be oscillated about the shaft.

7. An article handling apparatus comprising means for engaging one side of a row of articles, means for engaging the opposite side of the row of articles, a weighted oscillatable member for supporting the means for engaging one side of the row of articles, a second oscillatable member for supporting the means for engaging the opposite side of the row of articles, means for urging said second oscillatable means to carry the article engaging means toward the article, gearing interconnecting the oscillatable members to normally overcome the urging means and hold the article engaging means out of engagement with the articles, and means for imparting motion to said weighted oscillatable member to move it toward the article and permit the urging means to move the other oscillatable member toward the articles.

8. An article handling apparatus comprising means for engaging one side of a row of articles, means for engaging the opposite side of the row of articles, a weighted oscillatable member for supporting the means for engaging one side of the row of articles, a second oscillatable member for supporting the means for engaging the opposite side of the row of articles, means for urging said second oscillatable means to carry the article engaging means toward the article, gearing interconnecting the oscillatable members normally to overcome the urging means and hold the article engaging means out of engagement with the articles, means for imparting motion to said weighted oscillatable member to move it toward the article and permit the urging means to move the other oscillatable member toward the articles, and cooperating stops formed on the oscillatable members for causing them to move in one direction when the article engaging means are in engagement with the articles.

9. In an article handling apparatus, a pair of article engaging members for engaging opposite sides of a movable article, slidable frameworks for supporting said article engaging members, means supporting said frameworks for relative sliding movement and for combined sliding movement, racks on said frameworks, a gear rotatably positioned between and in mesh with said racks, means mounting said gear for sliding movement, and resilient means for urging said gear to maintain a fixed position whereby movement of one of said frameworks will, through said gear, transmit movement to the other framework to urge it to move in a direction opposite to the direction of movement of said one framework to grip an article whereby further movement of said one framework will slide said gear, framework, and gripped article to another position.

10. In an article handling and forming apparatus, a pair of opposed broaching tools for surface broaching opposite sides of a plurality of blanks, means for actuating said broaching tools simultaneously, clamping jaws positioned between the broaching tools to hold blanks during the forming of articles from the blanks by the broaching tools, article engaging means for engaging articles formed by the broaching tools and held by the clamping jaws for engaging one side of a plurality of articles, cooperating article engaging means cooperating with the first-mentioned article engaging means for moving into engagement with the opposite side of the plurality of articles, and means interconnecting the two article engaging means to initially move them in opposite directions for engaging the articles and to then move them both in the same direction to remove the articles from the clamping jaws.

11. A combination of a broaching apparatus including means for clamping a plurality of blanks in position to be surface broached, and means for broaching the blanks to form articles, with means for unloading the broached articles including unloading members engageable with the articles in said position, actuating means for the unloading members, and means interconnecting the unloading members for causing one of the unloading members to move toward the other unloading member and then to move with said other unloading member.

12. The combination of a processing machine and an unloading apparatus comprising means for engaging opposite surfaces of a group of blanks to be processed to hold the blanks in a predetermined position, a broaching tool for processing surfaces of the blanks to form articles from the blanks, and means operable after the articles are formed including unloading members engageable with the articles in said position, actuating means for the unloading members, and means including a plurality of gears interconnecting said unloading members to cause one of said unloading members to engage the articles and then to move with said other unloading member to cooperate with it in carrying articles out of said predetermined position.

13. An article handling and forming apparatus comprising means for holding a plurality of elongated blanks in face to face relation to form a group with one end of the group in position for broaching including means at said end of the group for applying pressure to the outside blanks of the plurality of blanks to compress them together during surface broaching of the plurality of blanks, means movable at right angles to the faces of the blanks to form and to sever articles from the blanks by surface broaching them while they are held by the holding means under pressure, a pair of unloading members engageable with opposite edges of the formed articles, and a common actuator for said unloading members movable in a continuous path and including mechanism constructed to move one of the unloading members in a continuous path away from the position in which the blanks are formed into articles to an unloading position, and to move the other unloading member toward said first unloading member to grip the formed articles therebetween and to thereafter move with said first unloading member for moving the formed articles to unloading position.

JOEL R. JOHNSON.